United States Patent

[11] 3,608,066

| [72] | Inventor | Paul-Robert Illartein<br>la Chapelle-St-Mesmin, France |
|---|---|---|
| [21] | Appl. No. | 833,719 |
| [22] | Filed | June 16, 1969 |
| [45] | Patented | Sept. 21, 1971 |
| [73] | Assignee | Societe en nom collectif "Science Union et Cie Societe Francaise de Recherche Medicale," Surresnes France |
| [32] | Priority | June 19, 1968 |
| [33] | | France |
| [31] | | 155,603 |

[54] PHARMACEUTICAL PREPARATION BASED ON BACTERIAL ANTIGENS
10 Claims, No Drawings

[52] U.S. Cl. .................................................. 424/46, 424/92
[51] Int. Cl. ................................................. A61k 13/00
[50] Field of Search ...................................... 424/46, 88, 92, 93; 34/5

[56] References Cited
UNITED STATES PATENTS

| 1,949,375 | 2/1934 | Jones............................. | 424/92 |
|---|---|---|---|
| 2,011,225 | 8/1935 | Krueger......................... | 424/92 |
| 2,040,794 | 5/1936 | Powell........................... | 424/92 |
| 2,798,835 | 7/1957 | Markham et al.............. | 424/46 |
| 2,798,836 | 7/1957 | Bird et al. ...................... | 424/46 |
| 2,853,797 | 9/1958 | Graham et al. ............... | 34/5 |
| 2,897,600 | 8/1959 | Graham et al. ............... | 34/5 |
| 2,959,325 | 11/1960 | Beard........................... | 222/1 |
| 3,378,443 | 4/1968 | Cooper et al. ................ | 424/91 |

*Primary Examiner*—Shep K. Rose
*Attorneys*—Hueschen and Kurlandsky and Gordon W. Hueschen

ABSTRACT: A pharmaceutical preparation for the treatment of infections of the respiratory tract, consisting of, in the desiccated and finely micronized state, lyophilized killed micro-organisms and their lyzates, selected from specific micro-organisms previously recognized to be responsible for such kind of infection, and also micro-organisms not previously recognized to be responsible for such kind of infection, and administered by inhalation in aerosol form.

3,608,066

PHARMACEUTICAL PREPARATION BASED ON BACTERIAL ANTIGENS

The present invention provides a preparation based on bacterial antigens for use in the immunotherapy of both the upper and lower parts of the respiratory tract.

The bacteriological analyses of the expectorations of a large number of patients suffering from infections of the respiratory tract revealed that, in addition to the traditional microbial flora, for example the streptococci, staphylococci and pneumococci, this sputum frequently contains micro-organisms not usually encountered in this part of the organism, for example *Pseudomonas* species, *Escherichia coli*, *Proteus* species and *Enterococci* species. These latter micro-organisms are not considered normally indigenous to the respiratory tract, that is, not indigenous to the respiratory tract of a subject not suffering from a respiratory tract infection.

One object of the present invention is the preparation of relevant antigens capable of acting against respiratory tract infections and even against such infections caused by these unusual micro-organisms.

It is another object of the present invention to prepare desiccated, partially lyzed bacterial antigens, obtained from killed bacteria, including if desired unusual bacteria of a type now found to be present in the respiratory tract of a subject afflicted with a respiratory tract infection.

It is a further object of this invention to provide a finely micronized product of a particle size within the range of 2 to 5 $\mu$, to enable the antigens to penetrate to the level of the pulmonary alveoli and of the alveolar tissue.

The present invention thus provides a pharmaceutical preparation based on bacterial antigens for the inhalation treatment of infections of the respiratory tract, which comprises, in the desiccated and finely micronized state, killed lyophilized micro-organisms of a type found to be present in the respiratory tract of subjects afflicted with respiratory infections (including, if desired and preferably, both bacterial normally indigenous to the respiratory tract and bacteria not normally indigenous to the respiratory tract) and their lyophilized lyzates, together with a pharmaceutically suitable carrier. This new bacterial antigen product has been demonstrated to have an immunizing and desensitizing activity and can be prepared as follows:

First, as mentioned above, the bacterial micro-organisms are chosen from those species most frequently encountered in infections of the upper and lower parts of the respiratory tract, including if desired (and preferably) those species previously mentioned as being nonnormally indigenous to the respiratory tract.

The selected bacteria species are then individually or, to the extend possible, simultaneously cultivated by methods and procedures conventionally used in bacteriology in a liquid or other, e.g., gel, medium, by surface culture or preferably by submerged culture, in any case chosen to suit each type of micro-organism involved, and which at the same time preferably ensures most rapid growth and maximum concentrations of antigens.

The bacteria, preferably after attaining full growth and maximum antigen production, are killed, as by suitably heating them at a temperature adapted to each type of bacteria, ranging, for example, from 56° C. for some micro-organisms to 65° C. for the most resistant strains, for a period of time sufficient to ensure that they are killed.

After having thus deprived the bacterial micro-organisms of their pathogenic properties, they are concentrated and collected by any method known per se, for example, by high-speed centrifugation of the inactivated cultures.

The collected dead bacteria are then suspended in distilled water so as to arrive at a predetermined and known concentration, e.g., a concentration of 100,000 million micro-organisms (per species involved) per milliliter. The pH value of these suspensions is conventionally adjusted to a relatively neutral pH within the range of 5.5 to 7.5, the exact pH varying according to the individual micro-organism, but such variation being of no significance in the practice of the invention.

The controlled lysis of the dead bacteria is then carried out by known physical methods, for example, by slow freezing followed by rapid defreezing, at a temperature within the range of −20° C. to +55° C., and, if desired (and preferably) a final short, measured ultrasonic treatment.

The lysis, which is preferably varied for maximum results and effectiveness according to the species concerned, can be controlled in conventional manner by measuring the variation in optical density with a previously standardized scale, and adjusting the extend and period of lysis to obtain maximum results, i.e., lysis.

The suspensions, which contain both lyzed and unlyzed micro-organisms, are then mixed, i.e., combined, and homogenized, in previously selected proportions, for example those shown below, and, if desired, admixed with an appropriate preservative, for example, phenylmercuric nitrate or preferably ethylmercuric thiosalicylate.

The antigenic suspensions are charged under sterile conditions into containers and congealed and lyophilized by any of the classic methods, to form a desiccated product which preferably contains about 2 percent of residual humidity.

The dry product is mechanically micronized in a ball mill or in a micronizer operated with filtered, sterile compressed air, or in other suitable manner, to a particle size within the range of 2 to 5 $\mu$.

This particle size ensures that the product can penetrate to the level of the pulmonary alveoli.

The finely powered product is charged into aerosol bottles, if desired in admixture with a lubricant, for example isopropyl myristate, or with a wetting agent such as, for example sesquioleate of sorbitan.

The aerosol bottles may conveniently be provided with a seated dosing valve of 1/20 ml. without plunger tube, and then filled with, e.g., 10 ml., of a propellant gas, for example, a Freon such as dichlorodifluoromethane.

The following example illustrates the composition of a preparation according to the present invention.

Example

|  | in 1000 millions |
|---|---|
| Staphylococcus aureus, type I, II, III, serotype 4, 18 | 30 |
| Pseudomonas aeruqinosa, type I, 6, II | 30 |
| Escherichia coli, 0, 111: BA, 0 86: B7, 0 127: B8 | 30 |
| Diplococcus pneumoniae, type 1, 2, 4, 19 | 15 |
| Streptococcus pyrogenes, Gr A type 1, 4, 12, Gr C type 21 | 15 |
| Streptococcus faecalis, Gr D | 15 |
| Proteus-vulgaris, 0×12 | 15 |
| Neisseria catarrhalis | 15 |
| Hemophilus influenzae, type b | 7.5 |
| Klebsiella pneumoniae, type B | 7.5 |
| Total | 180 per aerosol container |

The above-identified selected bacterial species are individually cultivated by methods and procedures conventionally used in bacteriology in a liquid medium by submerged culture under conditions designed to ensure rapid growth and maximum concentrations of antigens.

The bacteria, after attaining full growth and maximum antigen production, are killed, by suitably heating them at a temperature ranging from 56° C. to 65° C. (for the most resistant strains), for a period of time sufficient to ensure that they are killed.

After having thus deprived the bacterial micro-organisms of their pathogenic properties, they are concentrated and collected by high-speed centrifugation of the inactivated cultures.

The collected dead bacteria are then suspended in distilled water so as to arrive at a concentration of 100,000 million micro-organisms per milliliter. The pH value of these suspensions is adjusted to a relatively neutral pH within the range of 5.5 to 7.5.

The controlled lysis of the dead bacteria is then carried out by slow freezing followed by rapid defreezing, at a temperature within the range of −20° C. to +55° C., and a final short, measured ultrasonic treatment. The lysis is controlled in conventional manner by measuring the variation in optical density with a previously standardized scale, and adjusting the extend and period of lysis for each species to obtain maximum lysis.

The suspensions, which contain both lyzed and unlyzed micro-organisms, are then combined and homogenized in the proportions shown above, and admixed with ethylmercuric thiosalicylate as preservative.

The antigenic suspensions are charged under sterile conditions into containers an congealed and lyophilized by classic methods, to form a desiccated product which contains about 2 percent of residual humidity.

The dry product is mechanically micronized in a micronizer operated with filtered, sterile compressed air, to a particle size within the range of 2 to 5 $\mu$. This particle size ensures that the product can penetrate to the level of the pulmonary alveoli.

The finely powered product is charged into aerosol bottles, in admixture with less than 2 percent by weight e.g., 0.1 percent, of isopropyl myristate as lubricant, and with less than 2 percent by weight, e.g., 0.1 percent, of sesquioleate of sorbitan as wetting agent.

The aerosol bottles are provided with a seated dosing valve of 1/20 ml. without plunger tube, and then filled with 10 ml., of dichlorodifluoromethane as the propellant gas.

Packaged as indicated, with 180 dosages per aerosol container, each inhalation corresponds to a dose of 1000 million micro-organisms.

The antigenic preparation obtained in this manner produces in animals an active immunity as demonstrated by the increased content of specific antibodies in the serum of animals treated therewith and, further, by the enhanced resistance of the animals against inoculation with the corresponding micro-organisms.

The identical result is obtained in human therapy when patients are given 3 to 12 daily doses of the composition, this corresponding to 3–12×1000 million micro-organisms, per day. Conditions which can advantageously be treated in this manner comprise all of the acute and chronic infections of the upper and lower parts of the respiratory tract, for example rhinitis, pharyngitis, bronchitis, sinusitis, and the like. The duration of the treatment varies with the indications in each particular case and can be prolonged without inconvenience since the product is very well tolerated.

Various modifications may be made in the compositions, methods and procedures of the present invention without departing from the spirit thereof, as obvious modifications and equivalents will be apparent to one skilled in the art.

We claim:

1. A containerized pharmaceutical preparation suitable for treatment against acute and chronic infections of he upper and lower parts of the respiratory tract, including particularly rhinitis, pharygitis, bronchitis, sinusitis, and the like, based on bacterial antigens for the inhalation treatment of such infections of the respiratory tract, which comprises in the desiccated and finely micronized state, a combination of lyophilized killed streptococci, staphylococci, and pneumococci micro-organisms normally indigenous to the respiratory tract and their lyophilized lysates, with lyophilized killed Escherichia, Enterococci, Proteus, and Pseudomonas micro-organisms not normally indigenous to the respiratory tract but frequently found in the sputum expectorated by patients suffering from respiratory infections and their lyophilized lysates, admixed together with a propellant as a pharmaceutically suitable inhalation carrier.

2. A pharmaceutical preparation as claimed in claim 1 which is micronized to a particle size of 2 to 5 so as to enable the antigens to penetrate deeply down to the level of the pulmonary alveoli.

3. A pharmaceutical preparation as claimed in claim 1, in aerosol form, including a propellant gas.

4. A pharmaceutical preparation as claimed in claim 7, wherein the propellant gas is dichlorodifluoromethane.

5. A pharmaceutical preparation as claimed in claim 1, which comprises different strains of the following micro-organisms: Escherichia coli, Pseudomonas aeruqinosa, Proteus vulgaris, Streptococcus faecalis, Streptococcus pyogenes, Staphylococcus aureus, Diplococcus pneumoniae, Neisseria catarrhalis, Hemophilus influenzae and Klebsiella pneumoniae, comprising on the order of 180 thousand million micro-organisms per unit package.

6. A pharmaceutical preparation as claimed in claim 9, comprising about *24* different strains of said micro-organisms.

7 A pharmaceutical preparation as claimed in claim 9 totaling on the order of 1,000 million micro-organisms per unit dose.

8. The preparation of claim 1 in an inhalation aerosol container provided with a dosing valve and charged with the said preparation of claim 1.

9. The preparation of claim 1 wherein the desiccated micro-organisms contain approximately 2 percent residual humidity.

10. Immunotherapeutic method of enhancing resistance and developing immunity in a living animal body against respiratory tract infection, which consists in administering to said living animal body in inhalation in aerosol form, three to 12 times a day, a pharmaceutical preparation as claimed in claim 1 containing on the order 1000 million micro-organisms per dose.

UNITED STATES PATENT OFFICE
CERTIFICATE OF CORRECTION

Patent No. 3,608,066                    Dated   21 September 1971

Inventor(s)   Paul Robert Illartein          -   PAGE - 1

It is certified that error appears in the above-identified patent and that said Letters Patent are hereby corrected as shown below:

| | |
|---|---|
| Column 1, line 37<br>Application Page 2, line 15: | "bacterial"<br>    should read<br>--- bacteria --- |
| Column 1, line 51<br>Application Page 2, line 29: | "extend"<br>    should read<br>--- extent --- |
| Column 2, line 10<br>Application Page 4, line 2: | " extend"<br>    should read<br>--- extent --- |
| Column 2, line 28<br>Application Page 4, line 20: | "powered"<br>    should read<br>--- powdered --- |
| Column 2, line 47<br>Application Page 5, line 5: | "aeruqinosa"<br>    should read<br>--- aeruginosa --- |
| Column 2, line 51<br>Application Page 5, line 18: | "pyrogenes"<br>    should read<br>--- pyogenes --- |
| Column 3, line 11<br>Application Page 6, line 9: | "extend"<br>    should read<br>--- extent --- |

UNITED STATES PATENT OFFICE
CERTIFICATE OF CORRECTION

Patent No. 3,608,066  Dated 21 September 1971

Inventor(s) Paul Robert Illartein  PAGE - 2

It is certified that error appears in the above-identified patent and that said Letters Patent are hereby corrected as shown below:

Column 3, line 18  "an"
Application Page 6, line 16:  should read
--- and ---

Column 3, line 25  "powered"
Application Page 6, line 24:  should read
--- powdered ---

Column 4, Claim 1, line 2  "he"
Application -Twice-amended  should read
Claim 1, line 2:  --- the ---

Column 4, Claim 1, line 4  "pharygitis"
Application-Twice-amended  should read
Claim 1, line 3:  --- pharyngitis ---

Column 4, Claim 2, line 2  "2 to 5"
Application Claim 6, line 2  should read
--- 2 to 5 microns ---

Column 4, Claim 3, line 2  "a propellant"
Application Claim 7, line 2:  should read
--- a freon propellant ---

Column 4, Claim 4, line 1  "Claim 7"
Application Claim 8, line 1:  should read
--- Claim 3 ---

UNITED STATES PATENT OFFICE
CERTIFICATE OF CORRECTION

Patent No. 3,608,066            Dated 21 September 1971

Inventor(s) Paul Robert Illartein       PAGE - 3

It is certified that error appears in the above-identified patent and that said Letters Patent are hereby corrected as shown below:

Column 4, Claim 5, line 3  
Application Claim 9, line 3:     "aeruqinosa"  
         should read  
         --- aeruginosa ---

Column 4, Claim 6, line 1  
Application Claim 10, line 1:     "Claim 9"  
         should read  
         --- Claim 5 ---

Column 4, Claim 7, line 1  
Application Claim 10, line 1:     "Claim 9"  
         should read  
         --- Claim 5 ---

Column 4, Claim 10, line 6  
Application Claim 12, line 5:     "order 1000"  
         should read  
         --- order of 1000 ---

Signed and sealed this 4th day of April 1972.

(SEAL)  
Attest:

EDWARD M. FLETCHER, JR.          ROBERT GOTTSCHALK  
Attesting Officer                Commissioner of Patents